United States Patent
Wakabayashi et al.

(10) Patent No.: US 11,460,756 B2
(45) Date of Patent: Oct. 4, 2022

(54) PROJECTOR

(71) Applicant: SEIKO EPSON CORPORATION, Tokyo (JP)

(72) Inventors: Shinichi Wakabayashi, Suwa (JP); Masatoshi Ito, Matsumoto (JP); Takahiro Totsuka, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 57 days.

(21) Appl. No.: 17/168,737

(22) Filed: Feb. 5, 2021

(65) Prior Publication Data
US 2021/0247671 A1 Aug. 12, 2021

(30) Foreign Application Priority Data

Feb. 6, 2020 (JP) .............................. JP2020-018474

(51) Int. Cl.
*G03B 21/14* (2006.01)
*G02B 7/02* (2021.01)
*H02K 41/035* (2006.01)

(52) U.S. Cl.
CPC ........... *G03B 21/142* (2013.01); *G02B 7/021* (2013.01); *H02K 41/0356* (2013.01)

(58) Field of Classification Search
CPC ...... G03B 21/00; G03B 21/14; G03B 21/142; G02B 7/021; H02K 41/0356
USPC .................................................... 353/88, 101
See application file for complete search history.

(56) References Cited

U.S. PATENT DOCUMENTS

| 2016/0227177 | A1  | 8/2016  | Mizoguchi |
| 2019/0066553 | A1  | 2/2019  | Ohkoba |
| 2020/0363707 | A1* | 11/2020 | Hirakura ................ G03B 21/14 |
| 2021/0294094 | A1* | 9/2021  | Wakabayashi ..... G02B 26/0875 |

FOREIGN PATENT DOCUMENTS

| JP | 2016-143989 A | 8/2016 |
| JP | 2019-039995 A | 3/2019 |

\* cited by examiner

*Primary Examiner* — William C. Dowling
(74) *Attorney, Agent, or Firm* — Dority & Manning, P.A.

(57) ABSTRACT

A projector includes an optical path change device placed between a light modulation device and a projection optical device. The optical path change device has an optical member holding part that holds an optical member that a light modulated by the light modulation device enters, and a supporting member that swingably supports the optical member holding part. The supporting member is supported by a holding member that holds the light modulation device or the projection optical device.

15 Claims, 11 Drawing Sheets

PROJECTOR

The present application is based on, and claims priority from JP Application Serial Number 2020-018474, filed Feb. 6, 2020, the disclosure of which is hereby incorporated by reference herein in its entirety.

BACKGROUND

1. Technical Field

The present disclosure relates to a projector including an optical path change device.

2. Related Art

JP-A-2019-039995 discloses a projector that enlarges and projects a light modulated by a light modulation device such as a liquid crystal panel. The projector of JP-A-2019-039995 includes a pixel shift device placed between the light modulation device and a projection system. The pixel shift device is an optical path change device that shifts an optical path of an incident light. An optical path is shifted by the pixel shift device and an image display position is shifted by a smaller amount than a single pixel, and thereby, an image with higher resolution than the resolution of the light modulation device may be displayed. The pixel shift device of JP-A-2019-039995 includes a glass plate placed in an optical path of the light modulated by the light modulation device and a holding member that holds the glass plate, and shifts the optical path of the image light by rotating the holding member using a motor and changing the orientation of the glass plate.

In the projector, the position in which the optical path change device (pixel shift device) is placed is in a gap between the light modulation device and the projection system. However, the gap between the light modulation device and the projection system is narrower and many structural parts are collected therein, and thereby, there is no room and it is difficult to secure the space for placement of the optical path change device. Therefore, the placement of the optical path change device is difficult. When a space in which the optical path change device can be easily placed is secured, the projector is upsized.

SUMMARY

A projector according to an aspect of the present disclosure includes a light source, a light modulation device that modulates a light output from the light source, a projection optical device that projects the light modulated by the light modulation device, an optical path change device placed between the light modulation device and the projection optical device and changing an optical path of the light modulated by the light modulation device, and a holding member that holds the light modulation device or the projection optical device, wherein the holding member has an opening through which the light modulated by the light modulation device passes, the optical path change device has an optical member that the light modulated by the light modulation device enters, an optical member holding part that holds the optical member, and a supporting member that swingably supports the optical member holding part, and the supporting member is supported by the holding member.

DESCRIPTION OF EXEMPLARY EMBODIMENTS

As below, exemplary embodiments of the present disclosure will be explained with reference to the drawings. In this specification, for convenience of explanation, an X-axis, a Y-axis, and a Z-axis are shown as three axes orthogonal to one another and one side in the X-axis direction is referred to as "+X direction" and the other side is referred to as "−X direction". Further, one side in the Y-axis direction is referred to as "+Y direction" and the other side is referred to as "−Y direction", and one side in the Z-axis direction is referred to as "+Z direction" and the other side is referred to as "−Z direction".

Projector

Figure 1:
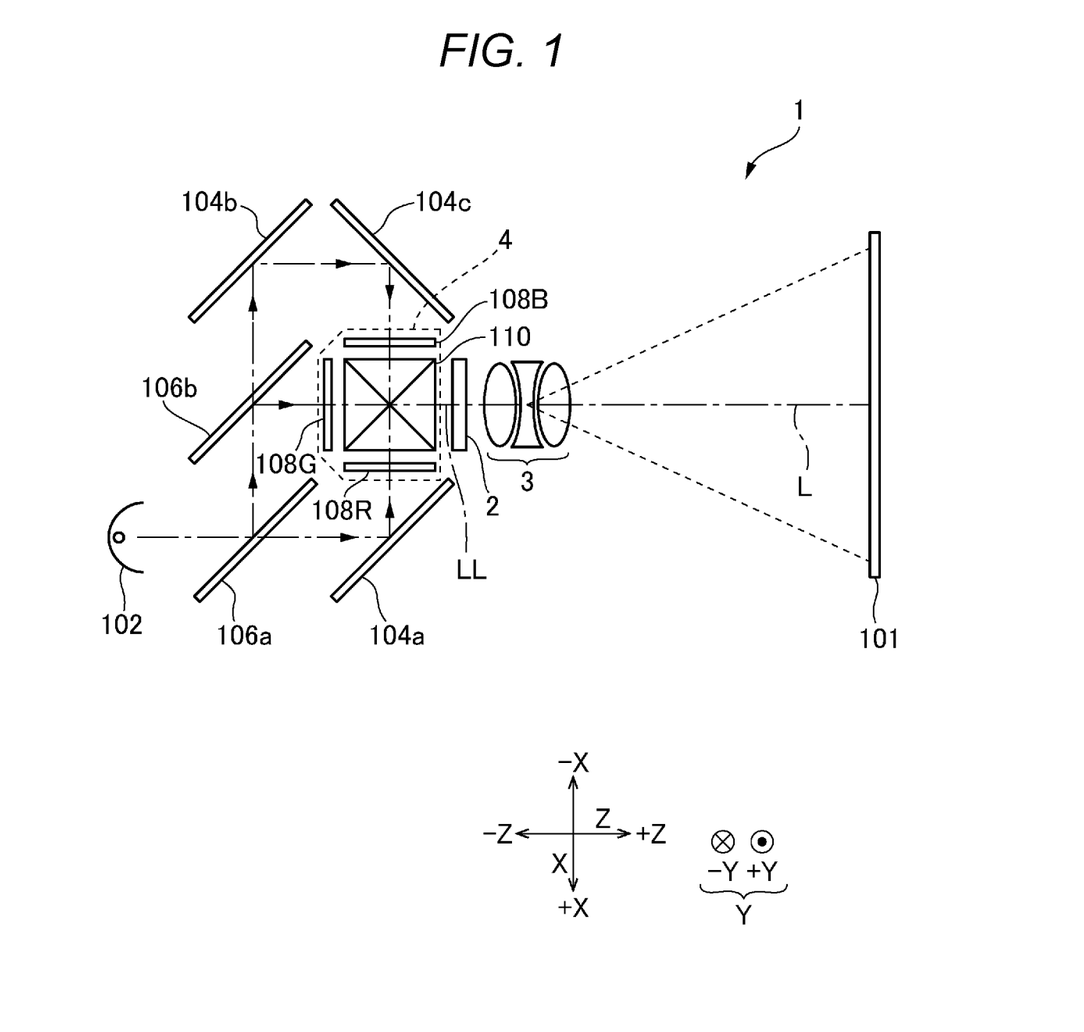
FIG. 1 is an explanatory diagram showing an optical configuration of a projector according to an embodiment.

FIG. 1 is an explanatory diagram showing an optical configuration of a projector according to an embodiment. A projector 1 shown in FIG. 1 is an LCD projector. The projector 1 is an image display apparatus that displays a picture on a screen 101 based on a picture signal input from outside. The projector 1 includes a light source 102, mirrors 104a, 104b, 104c, dichroic mirrors 106a, 106b, liquid crystal display elements 108R, 108G, 108B, a dichroic prism 110, an optical path change device 2, and a projection optical device 3. Further, an exterior housing (not shown) that houses the light source 102, the mirrors 104a, 104b, 104c, the dichroic mirrors 106a, 106b, the liquid crystal display elements 108R, 108G, 108B, the dichroic prism 110, and the optical path change device is provided.

In the embodiment, the liquid crystal display elements 108R, 108G, 108B and the dichroic prism 110 form a light modulation device 4. The light modulation device 4 shown in FIG. 1 uses a transmissive liquid crystal panel as will be described later, however, may use another type of light modulation device. For example, a light modulation device having a reflective liquid crystal panel or a light modulation device having a DMD (digital micromirror device) may be used.

The light source 102 includes e.g. a halogen lamp, a mercury lamp, a light emitting diode (LED), and a laser source. Further, one that outputs a white light is used as the light source 102. The light output from the light source 102 is separated into a red light and the other light by e.g. the dichroic mirror 106a. The red light is reflected by the mirror 104a, then, enters the liquid crystal display element 108R, and the other light is further separated into a green light and a blue light by the dichroic mirror 106b. The green light enters the liquid crystal display element 108G, and the blue light is reflected by the mirrors 104b, 104c, then, enters the liquid crystal display element 108B.

The liquid crystal display elements 108R, 108G, 108B are respectively light modulation elements that modulate the incident lights according to image signals. The liquid crystal display elements 108R, 108G, 108B are transmissive liquid crystal panels and include pixels arranged in matrix forms of 1080 rows in the longitudinal direction and 1920 columns in the lateral direction. In the respective pixels, amounts of the transmitted lights relative to the incident lights are adjusted and light amount distributions of all pixels are cooperatively controlled in the respective liquid crystal display elements 108R, 108G, 108B. The lights respectively spatially modulated by the liquid crystal display elements 108R, 108G, 108B are combined by the dichroic prism 110, and a full-color picture light LL is output from the dichroic prism 110. Then, the output picture light LL is enlarged and projected on the screen 101 by the projection optical device 3.

In this specification, the Z-axis directions are aligned with an optical axis L of the picture light LL output from the light modulation device 4. The +Z direction is an output direction of the picture light LL and the optical path change device 2 is placed in the +Z direction of the light modulation device 4. As shown in FIG. 1, the liquid crystal display element 108R is placed in the +X direction of the dichroic prism 110, the liquid crystal display element 108B is placed in the −X direction of the dichroic prism 110, and the liquid crystal display element 108G is placed in the −Z direction of the dichroic prism 110.

The optical path change device 2 is placed between the dichroic prism 110 and the projection optical device 3. The projector 1 shifts the optical path of the picture light LL by the optical path change device 2 (performs the so-called "pixel shift"), and thereby, may display an image with higher resolution than the resolution of the liquid crystal display elements 108R, 108G, 108B on the screen 101. For example, when the liquid crystal display elements 108R, 108G, 108B have full HD resolution, a 4K image may be displayed.

Figure 2:
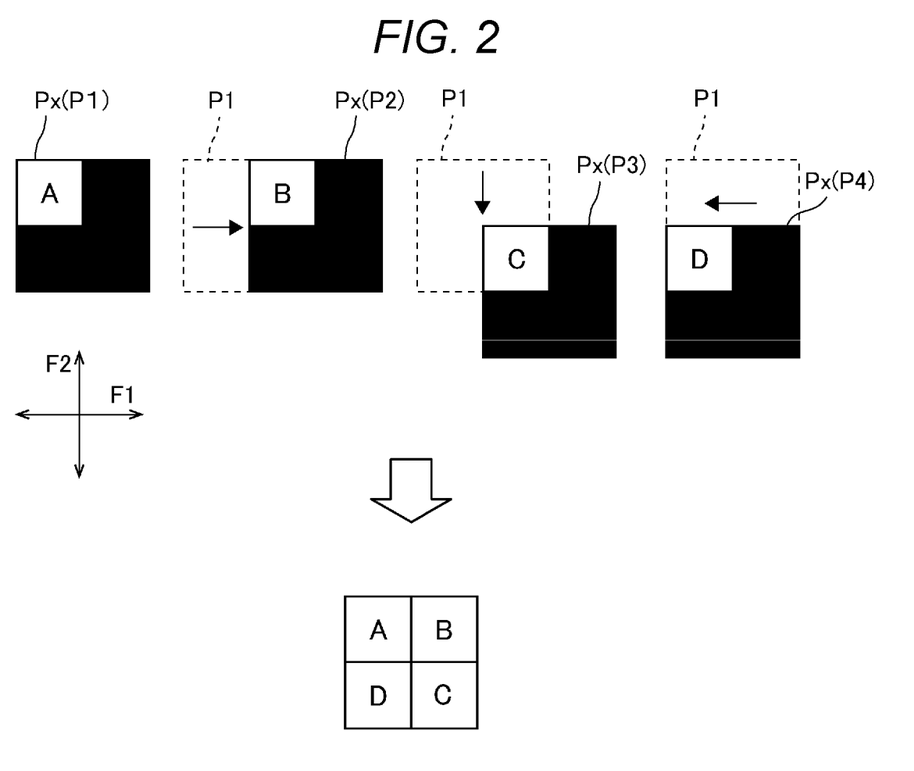
FIG. 2 is an explanatory diagram showing shifts of an image display position by pixel shift.

Next, a principle for increasing resolution by optical path shift will be briefly explained using FIG. 2. FIG. 2 is an explanatory diagram showing shifts of an image display position by optical path shift of the picture light. As will be described later, the optical path change device 2 has a glass plate 10 as a plate-like optical member that the picture light LL formed by a combination of the lights modulated by the liquid crystal display elements 108R, 108G, 108B enters. The posture of the glass plate 10 is changed, and thereby, the optical path of the picture light LL is shifted using refraction.

The optical path change device 2 swings the glass plate 10 in two directions of a first swing direction about a first swing axis J1 crossing the optical axis L and a second swing direction about a second swing axis J2 crossing the optical axis L and crossing the first swing axis J1. When the glass plate 10 swings in the first swing direction, the optical path of the light entering the glass plate 10 shifts in a first direction F1. When the glass plate 10 swings in the second swing direction, the optical path of the light entering the glass plate 10 shifts in a second direction F2 crossing the first direction F1. Thereby, a pixel Px displayed on the screen 101 is displayed with shifts in the first direction F1 and the second direction F2 crossing the first direction F1.

The projector 1 combines a shift of the optical path in the first direction F1 and a shift of the optical path in the second direction F2, and thereby, increases apparent pixels and increases the resolution of the image projected on the screen 101. For example, as shown in FIG. 2, the pixel Px is moved in a position respectively shifted by half pixels (i.e., halves of the pixel Px) in the first direction F1 and the second direction F2. Thereby, the image display position on the screen 101 may be shifted to an image display position P2 with a shift of a half pixel in the first direction F1 from an image display position P1, to an image display position P3 with shifts of half pixels respectively in the first direction F1 and the second direction F2 from the image display position P1, and to an image display position P4 with a shift of a half pixel in the second direction F2 from the image display position.

As shown in FIG. 2, an optical path shift operation is performed to display the image for fixed periods of time respectively in the image display positions P1, P2, P3, P4, and changes display contents in the liquid crystal display elements in synchronization with the optical path shift operation. Thereby, apparently, pixels A, B, C, D having smaller sizes than the pixel Px may be displayed. For example, when the display of the pixels A, B, C, D is performed at a frequency of 60 Hz as a whole, it is necessary to control the liquid crystal display elements to execute display at a quadruple speed in correspondence with the image display positions P1, P2, P3, P4. That is, the frequency of the display in the liquid crystal display elements, the so-called refresh rate is 240 Hz.

Note that, in the example shown in FIG. 2, the first direction F1 and the second direction F2 are directions orthogonal to each other and the first direction F1 and the second direction F2 are arrangement directions of the pixels Px displayed in a matrix form on the screen 101, however, the first direction F1 and the second direction F2 may be directions tilted relative to the arrangement directions of the pixels Px, not the directions orthogonal to each other. Even in the shift directions, the pixel Px may be moved to the image display positions P1, P2, P3, P4 shown in FIG. 2 by appropriate combinations of the pixel shifts in the first direction F1 and the second direction F2. Further, the amount of shift of the image display position is not limited to the half pixel, but may be e.g. one quarter or three quarters of the pixel Px.

Fixing Base

Figure 3:
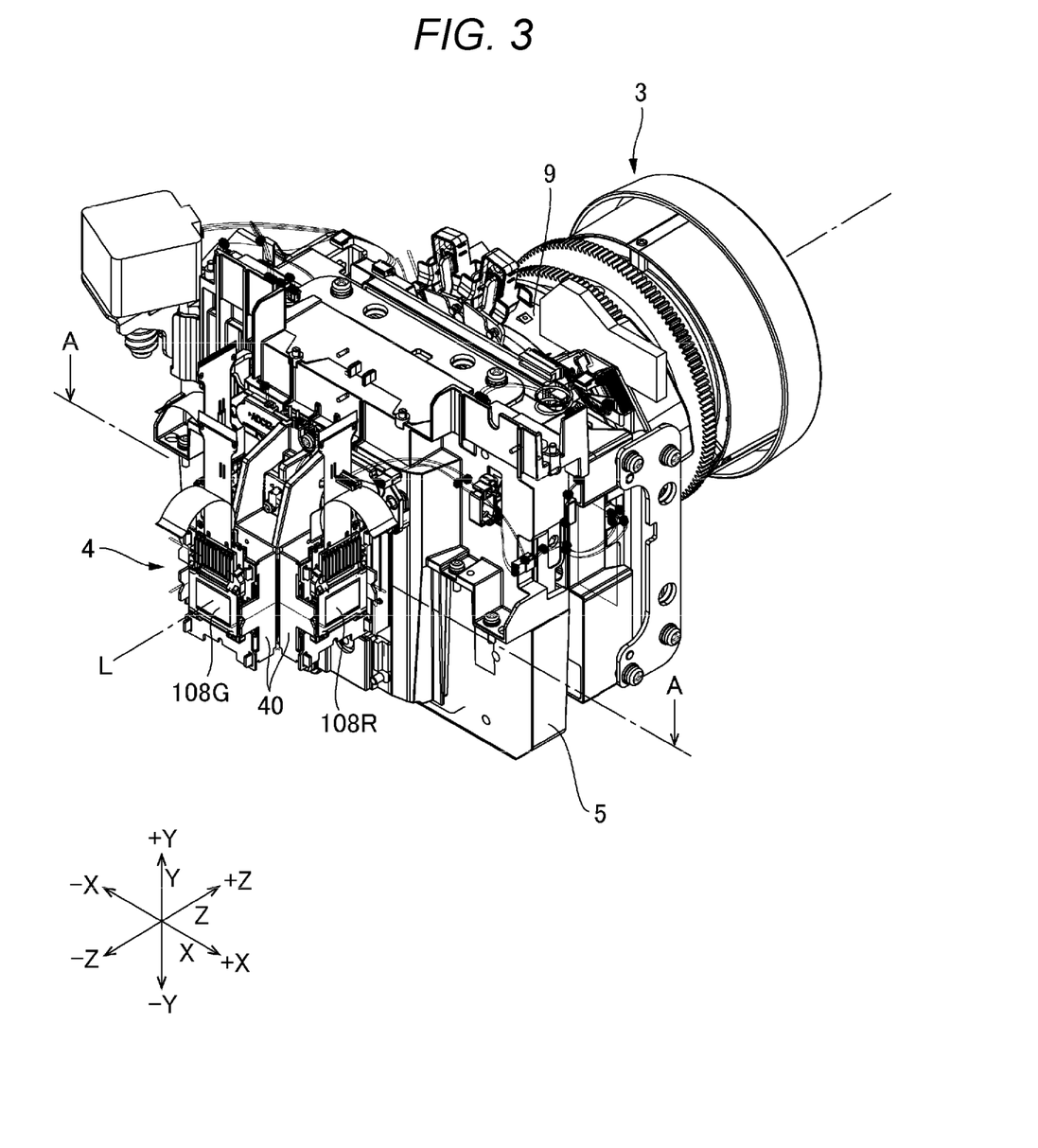
FIG. 3 is a perspective view showing a light modulation device, an optical path change device, and a projection optical device supported by a fixing base.

FIG. 3 is a perspective view showing the light modulation device 4, the optical path change device 2, and the projection optical device 3 supported by a fixing base 5. The projector 1 includes the fixing base 5 as a holding member that holds the light modulation device 4 and the projection optical device 3. In the embodiment, the fixing base 5 is made of a metal such as aluminum. As shown in FIG. 3, the projection optical device 3 is a lens unit that holds a lens group (not shown) by a lens tube 9 including a zoom ring, a focus ring and the like. The lens tube 9 is placed in the +Z direction of the fixing base 5 and extends in the Z-axis directions (optical axis directions). The lens tube 9 is held by the fixing base 5. The light modulation device 4 is placed in the −Z direction of the fixing base 5. The light modulation device 4 is held by a prism base as a supporting member (not shown) and held by the fixing base 5 via the prism base. In the embodiment, the fixing base 5 as the holding member holds both the light modulation device 4 and the projection optical device 3, however, is not limited to that. The fixing base 5 may hold only one of the modulation device 4 and the projection optical device 3. That is, the fixing base 5 may hold the light modulation device 4 and the projection optical device 3 may be fixed to the external housing by another member than the fixing base 5, or the fixing base 5 may hold the projection optical device 3 and the light modulation device 4 may be fixed to the external housing via the prism base. Or, the light modulation device 4 may be placed inside of an optical component housing within the external housing and the light modulation device 4 may be fixed to the optical component housing via the prism base.

Figure 4:
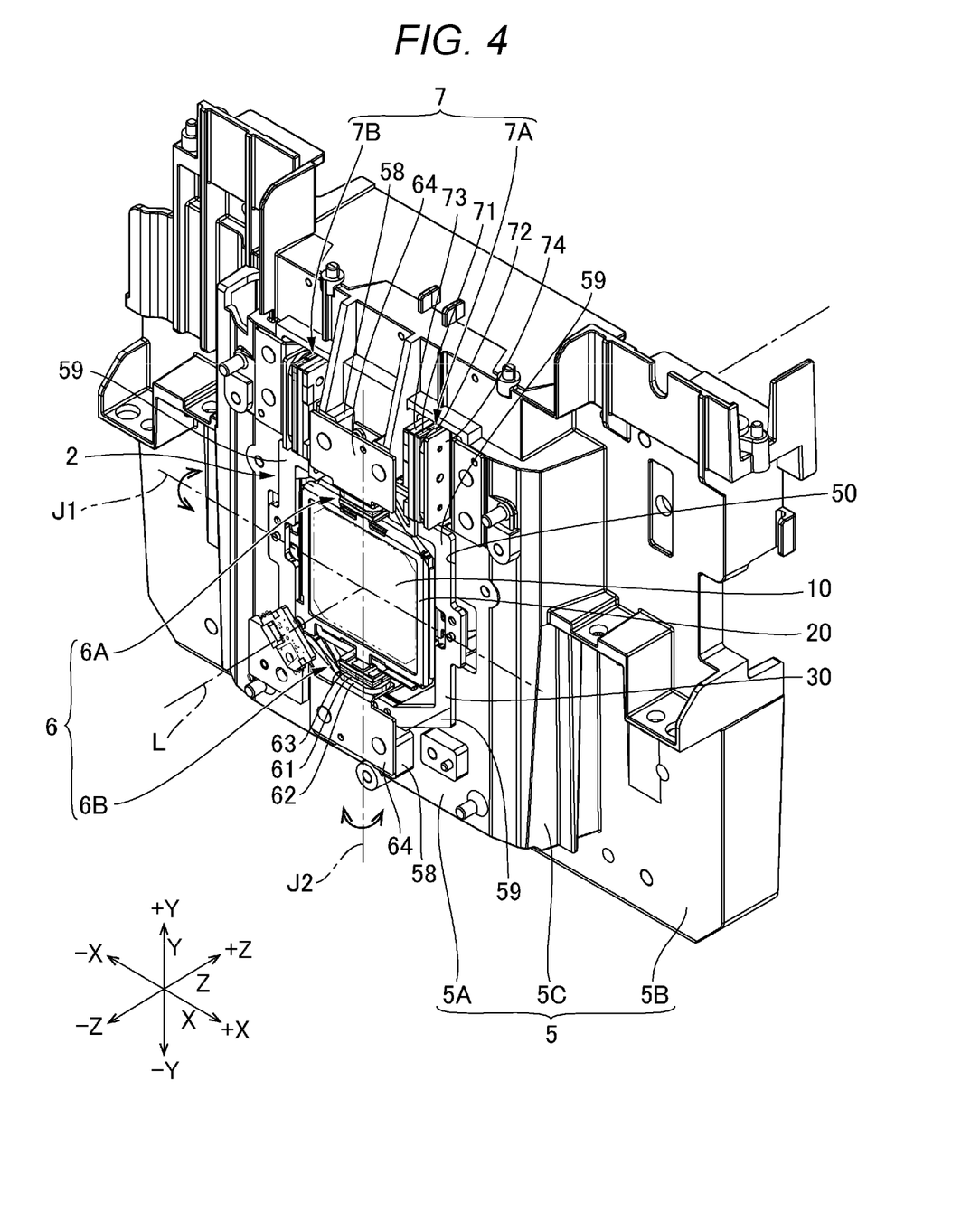
FIG. 4 is a perspective view of the optical path change device and the fixing base from an upstream of an optical path.
Figure 5:
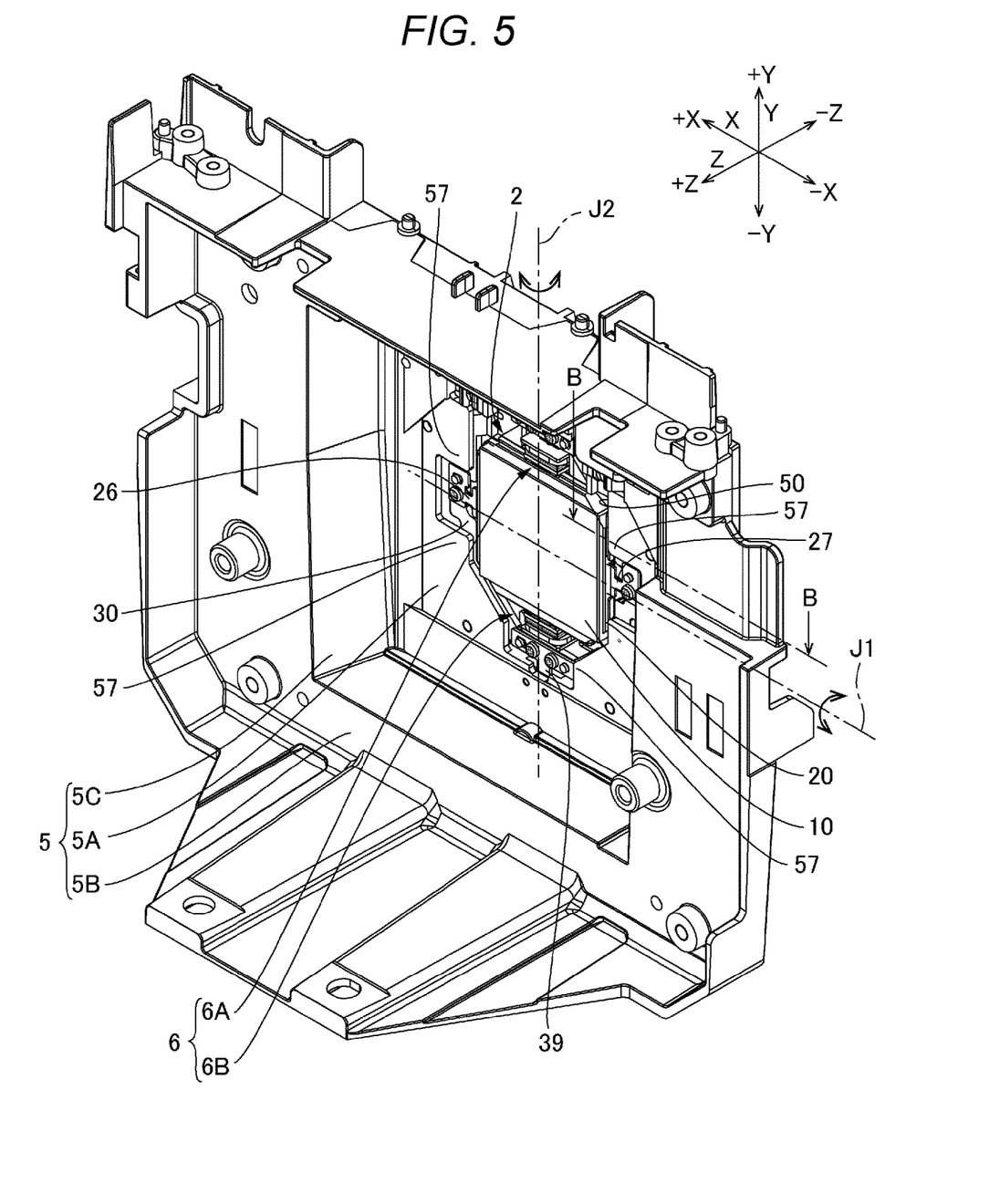
FIG. 5 is a perspective view of the optical path change device and the fixing base from a downstream of the optical path.
Figure 6:
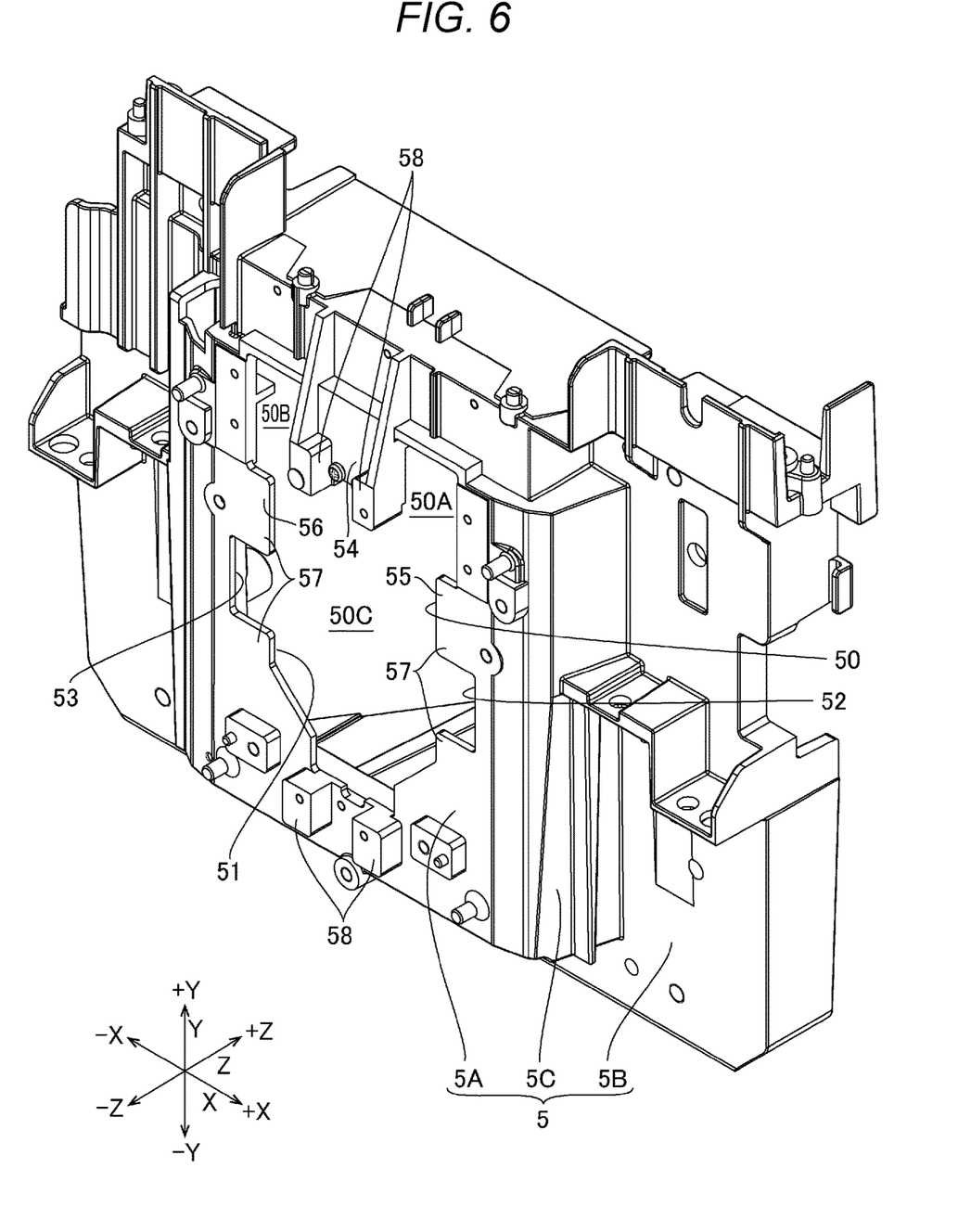
FIG. 6 is a perspective view of the fixing base from the upstream of the optical path.

FIG. 4 is a perspective view of the optical path change device 2 and the fixing base 5 from an upstream of the optical path (−Z direction). FIG. 5 is a perspective view of the optical path change device 2 and the fixing base 5 from a downstream of the optical path (+Z direction). FIG. 6 is a perspective view of the fixing base 5 from the upstream of the optical path (−Z direction).

As shown in FIG. 6, the fixing base 5 has a substantially rectangular shape as seen from the Z-axis directions (optical axis directions). The fixing base 5 includes a base plate 5A, a base frame 5B surrounding the outer periphery of the base plate 5A, and a coupling part 5C coupling the base plate 5A and the base frame 5B. The base frame 5B is located in the +Z direction of the base plate 5A, and the coupling part 5C bends from an end portion of the base plate 5A in the +Z direction and is coupled to the base frame 5B. An opening 50 penetrating in the Z-axis directions is provided in the base plate 5A.

As shown in FIGS. 4 and 5, the optical path change device 2 is held in a position overlapping with the opening 50 penetrating the fixing base 5 as seen from the optical axis directions (Z-axis directions). The picture light LL passing through the optical path change device 2 enters the projection optical device 3 from an end portion in the −Z direction of the lens tube 9 placed in the +Z direction of the opening 50.

As shown in FIG. 6, the opening 50 of the fixing base 5 has a symmetrical shape with respect to the X-axis directions. The fixing base 5 includes a first cutout portion 51 formed by cutting out of a center portion in the X-axis directions in the −Y direction at the edge of the opening 50 in the −Y direction. The first cutout portion 51 includes a tapered portion having a width in the X-axis directions narrower toward the −Y direction. Further, the fixing base 5 includes a second cutout portion 52 formed by cutting out of an edge of the opening 50 in the +X direction in a rectangular shape and a third cutout portion 53 formed by cutting out of an edge of the opening 50 in the −X direction in a rectangular shape. A first projecting portion 54 projecting in the −Y direction is formed at the center in the X-axis directions at an edge of the opening 50 in the +Y direction.

The opening 50 includes a first region 50A in the +X direction of the first projecting portion 54 and a second region 50B in the −X direction of the first projecting portion 54. In the first region 50A and the second region 50B, as will be described later, a second actuator 7 of the optical path change device 2 is placed. In a third region 50C provided in the −Y direction of the first projecting portion 54, the first region 50A, and the second region 50B, the glass plate 10 of the optical path change device 2 is placed. In the −Y direction of the first region 50A and the second region 50B, a second projecting portion 55 projecting from the edge of the opening 50 in the +X direction and a third projecting portion 56 projecting from the edge of the opening 50 in the −X direction are formed. The second projecting portion 55 and the third projecting portion 56 face in the X-axis directions.

The fixing base 5 includes abutting portions 57 provided at the edge in the +X direction and the edge in the −X direction of the opening 50. The abutting portions 57 face an outer frame 30 of the optical path change device 2 in the Z-axis directions (optical axis directions). In the embodiment, the four abutting portions 57 are provided to surround the third region 50C of the opening 50. The abutting portions 57 are provided in a corner portion in the −Y direction in an end portion of the second projecting portion 55 and in a corner portion in the −Y direction in an end portion of the third projecting portion 56. Further, the abutting portions 57 are provided in a corner portion in the −Y direction of the second cutout portion 52 and in a corner portion in the −Y direction of the third cutout portion 53.

Optical Path Change Device

Figure 7:
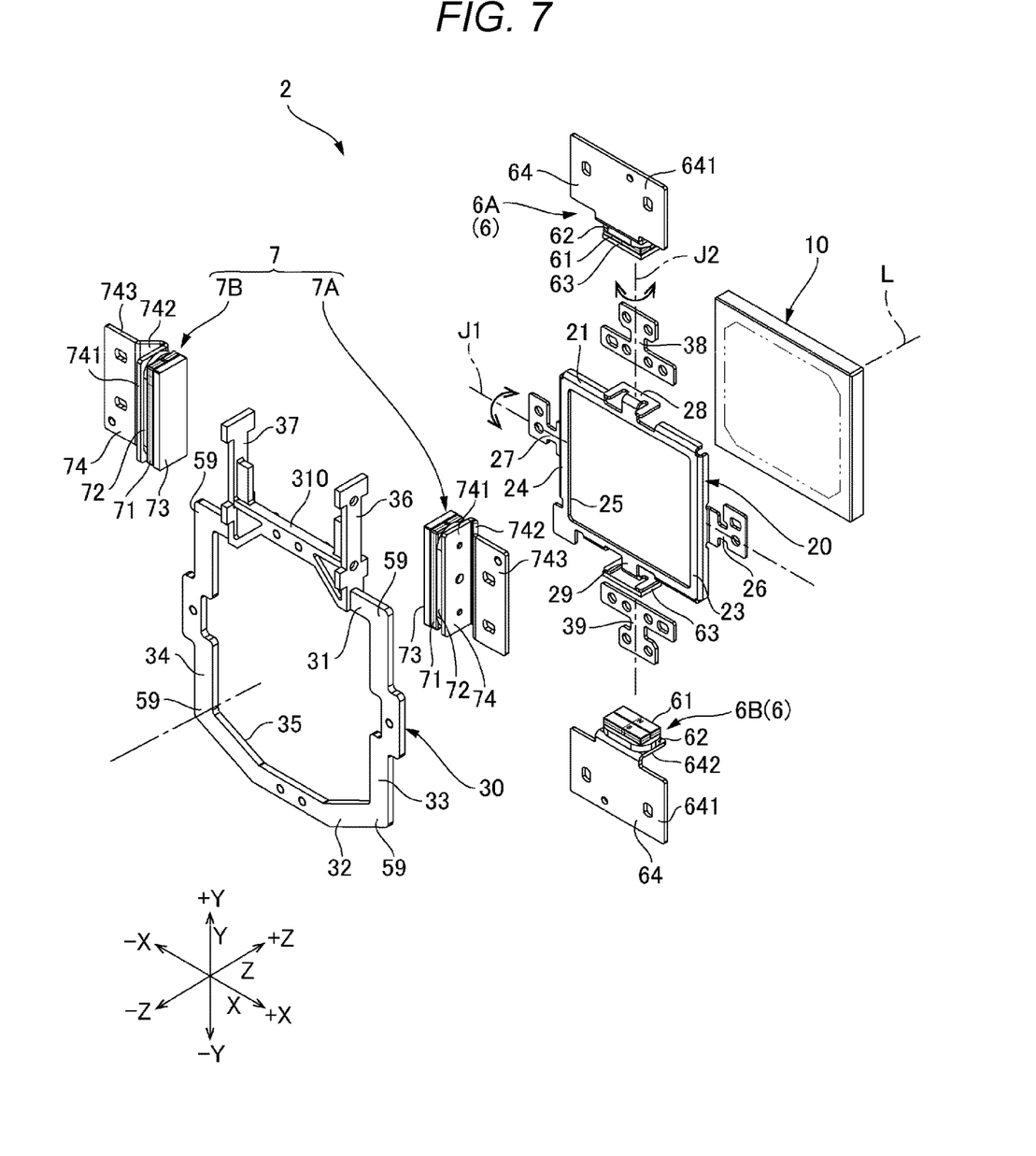
FIG. 7 is an exploded perspective view of the optical path change device.

FIG. 7 is an exploded perspective view of the optical path change device 2. As shown in FIGS. 4 and 7, the optical path change device 2 includes the rectangular glass plate 10, an inner frame 20 as an optical member holding part that holds the glass plate 10, and the outer frame 30 as a supporting member that swingably supports the inner frame 20. Further, the optical path change device 2 includes a first actuator 6 that swings the inner frame 20 and the second actuator 7 that swings the outer frame 30. Note that, the optical member holding part in the embodiment is the inner frame 20 having a frame shape, however, not limited to that. The part does not necessarily have the frame shape as long as the part holds the glass plate 10.

The glass plate 10 is an optical member having light transmissivity. The optical path change device 2 swings the inner frame 20 and the glass plate 10 around a position in which the normal direction of the glass plate 10 held by the inner frame 20 and the optical axis L of the picture light LL passing through the opening 50 coincide (hereinafter, referred to as "reference position"). In the reference position, the incident angle of the picture light LL to the glass plate 10 is 0°.

The constituent material of the glass plate 10 is not particularly limited, but various glass materials including e.g. white plate glass, borosilicate glass, and quartz glass may be used. Further, in the embodiment, the glass plate 10 is used as the optical member, however, any optical member having light transmissivity and formed using a material that refracts the picture light LL may be used. That is, in addition to the glass, plates formed using e.g. various crystal materials such as quartz crystal and sapphire, various resin materials such as polycarbonate resins and acrylic resins, etc. may be employed. Further, anti-reflection films may be formed on the light incident surface and the light exiting surface of the glass plate 10.

As shown in FIGS. 4 and 7, the inner frame 20 is a rectangular frame-like member surrounding the glass plate 10. The inner frame 20 includes a pair of first frame portion 21 and second frame portion 22 extending substantially in parallel to the X-axis and a pair of third frame portion 23 and fourth frame portion 24 extending substantially in parallel to the Y-axis. The inner frame 20 includes a rectangular first opening portion 25 surrounded by the first frame portion 21, the second frame portion 22, the third frame portion 23, and the fourth frame portion 24. The glass plate 10 is placed in the first opening portion 25 and fixed to the first frame portion 21, the second frame portion 22, the third frame portion 23, and the fourth frame portion 24. In the embodiment, the inner frame 20 is formed using a thin plate of stainless or the like and the first frame portion 21, the second frame portion 22, the third frame portion 23, and the fourth frame portion 24 are bending members formed by bending of thin plates.

The inner frame 20 includes a first shaft portion 26 and a second shaft portion 27. The first shaft portion 26 projects from the center of the third frame portion 23 in the Y-axis directions toward the +X direction. The second shaft portion 27 projects from the center of the fourth frame portion 24 in the Y-axis directions toward the −X direction. The inner frame 20 is coupled to the outer frame 30 by the first shaft portion 26 and the second shaft portion 27. Ends of the first shaft portion 26 and the second shaft portion 27 at opposite sides to the inner frame 20 overlap with the outer frame 30 and are fixed to the outer frame 30. Thereby, the inner frame 20 is supported by the outer frame 30 swingably about the first swing axis J1 as a straight line coupling the first shaft portion 26 and the second shaft portion 27. The first swing axis J1 extends orthogonally to the Z-axis directions (optical axis directions) and the Y-axis directions and in parallel to the X-axis directions.

The first actuator 6 includes a first magnetic drive mechanism 6A and a second magnetic drive mechanism 6B. The inner frame 20 includes a first projecting portion 28 projecting from the center of the first frame portion 21 in the X-axis directions toward the +Y direction and a second projecting portion 29 projecting from the center of the second frame portion 22 in the X-axis directions toward the −Y direction. The first magnetic drive mechanism 6A is placed at an end side of the first projecting portion 28. The second magnetic drive mechanism 6B is placed at an end side of the second projecting portion 29. The first actuator 6 applies a driving force about the first swing axis J1 to the inner frame 20 via the first projecting portion 28 and the second projecting portion 29.

The outer frame 30 is a frame-like member surrounding the inner frame 20. The outer frame 30 includes a first frame portion 31 placed in the +Y direction of the inner frame 20, a second frame portion 32 placed in the −Y direction of the inner frame 20, a third frame portion 33 placed in the +X direction of the inner frame 20, and a fourth frame portion 34 placed in the −X direction of the inner frame 20. The outer frame 30 includes a second opening portion 35 surrounded by the first frame portion 31, the second frame portion 32, the third frame portion 33, and the fourth frame portion 34 and the inner frame 20 is placed in the second opening portion 35. Of the first shaft portion 26 and the second shaft portion 27 coupling the inner frame 20 and the outer frame 30, the first shaft portion 26 is fixed to the third frame portion 33. Further, the second shaft portion 27 is fixed to the fourth frame portion 34.

The outer frame 30 includes a first projecting portion 36 and a second projecting portion 37 projecting from the first frame portion 31 in the +Y direction substantially in parallel. The first projecting portion 36 and the second projecting portion 37 are symmetrically placed with reference to the center of the outer frame 30 in the X-axis directions. As shown in FIG. 4, a third magnetic drive mechanism 7A of the second actuator 7 is placed in the +X direction of the first projecting portion 36. A fourth magnetic drive mechanism 7B of the second actuator 7 is placed in the −X direction of the second projecting portion 37. The second actuator 7 applies a driving force about the second swing axis J2 to the outer frame 30 via the first projecting portion 36 and the second projecting portion 37.

The first frame portion 31 has a center portion 310 extending substantially in parallel to the X-axis directions between the first projecting portion 36 and the second projecting portion 37. As shown in FIG. 4, the first magnetic drive mechanism 6A of the first actuator 6 is placed between the center portion 310 and the first frame portion 21 of the inner frame 20. The second frame portion 32 has a bending shape with a center portion in the X-axis directions projecting in the −Y direction. As shown in FIG. 4, the second magnetic drive mechanism 6B of the first actuator 6 is placed between the center portion of the second frame portion 32 in the X-axis directions and the second frame portion 22 of the inner frame 20.

A third shaft portion 38 and a fourth shaft portion 39 are fixed to the outer frame 30. The third shaft portion 38 and the fourth shaft portion 39 are formed from other members than the outer frame 30. The third shaft portion 38 is fixed to the center portion 310 of the outer frame 30 and projects from the center portion 310 in the +Y direction. The fourth shaft portion 39 is fixed to the center portion of the second frame portion 32 of the outer frame 30 in the X-axis directions and projects from the second frame portion 32 in the −Y direction.

The outer frame 30 is coupled to the edge of the opening 50 of the fixing base 5 by the third shaft portion 38 and the fourth shaft portion 39. That is, an end of the third shaft portion 38 in the +Y direction is fixed to an end of the first projecting portion 54 projecting from the edge of the opening 50 in the +Y direction. Further, an end of the fourth shaft portion 39 in the −Y direction is fixed to the edge of the opening 50 in the −Y direction. Thereby, the outer frame 30 is supported by the fixing base 5 swingably about the second swing axis J2 as a straight line coupling the third shaft portion 38 and the fourth shaft portion 39. The second swing axis J2 extends orthogonally to the Z-axis directions (optical axis directions) and the X-axis directions and in parallel to the Y-axis directions. The second actuator 7 swings the outer frame 30 about the second swing axis J2.

Sectional Configurations of Fixing Base and Optical Path Change Device 2

Figure 8:
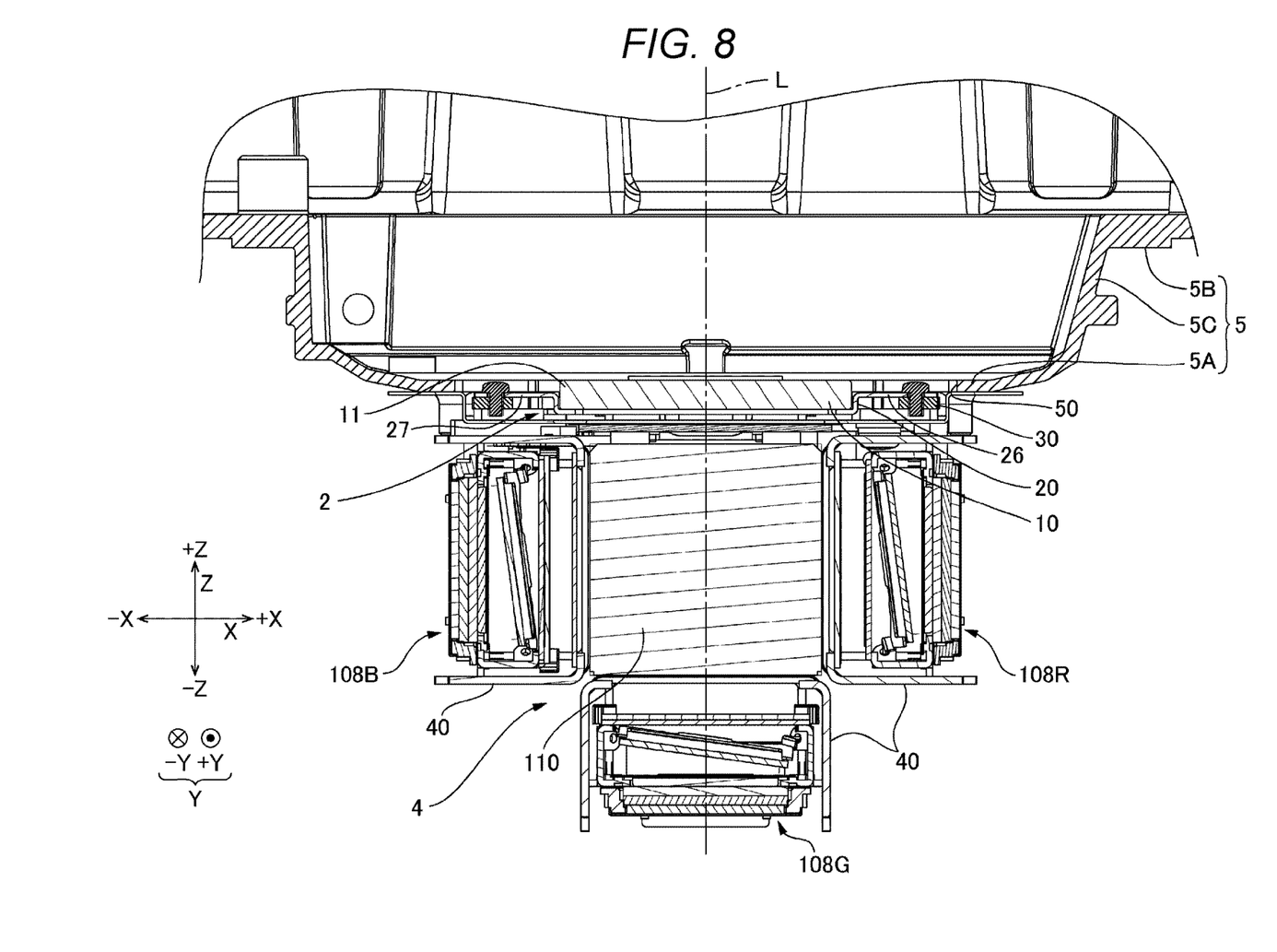
FIG. 8 is a sectional view of the light modulation device, the optical path change device, and the fixing base cut at a center of a glass plate.

FIG. 8 is a sectional view of the light modulation device 4, the optical path change device 2, and the fixing base 5 cut at a center of the glass plate 10 and cut in a position A-A in FIG. 3. As shown in FIGS. 3 and 8, the light modulation device 4 is assembled so that the liquid crystal display elements 108R, 108G, 108B held by plate members 40 may surround the +X direction, the −X direction, the −Z direction of the dichroic prism 110. The light modulation device 4 is fixed to the fixing base 5 via the prism base (not shown) and placed in the −Z direction of the opening 50 formed in the base plate 5A. The light modulation device 4 is held in a position in which a gap in the Z-axis directions between the base 5A and itself is formed. The optical path change device 2 is placed in the +Z direction of the light modulation device 4 and a part of the optical path change device 2 is inserted into an inner peripheral side of the opening 50.

As shown in FIG. 5, the glass plate 10 of the optical path change device 2 is inserted into an inner peripheral side of the third region 50C of the opening 50. As shown in FIGS. 7 and 8, the inner frame 20 holding the glass plate 10 is a bending member formed by bending of a thin plate and a part of the glass plate 10 in a plate thickness direction is fitted in the inside of the inner frame 20 and another part in the plate thickness direction projects from the inner frame 20 in the +Z direction. That is, the glass plate 10 includes a projecting portion 11 projecting from the inner frame 20 in the +Z direction. The projecting portion 11 projects from the inner frame 20 toward the opening 50 and is inserted into the opening 50. Therefore, the part of the optical path change device is placed at the inner peripheral side of the opening 50 and placed within a range of a plate thickness of the base plate 5A.

As shown in FIGS. 7 and 8, the first shaft portion 26 and the second shaft portion 27 of the inner frame 20 bend in the X-axis directions from end portions of the third frame portion 23 and the fourth frame portion 24 in the +Z direction. The first shaft portion 26 and the second shaft portion 27 contact the outer frame 30 from the +Z direction. Therefore, the inner frame 20 is placed at the inner peripheral side of the second opening portion 35 of the outer frame 30. In the embodiment, a plate thickness of the outer frame 30 is smaller than a height of the inner frame 20 in the Z-axis directions (optical axis directions). Therefore, as shown in FIG. 8, the outer frame 30 is placed within a range of the height of the inner frame 20 in the Z-axis directions (optical axis directions).

The outer frame 30 is fixed to the edge of the opening 50 via the third shaft portion 38 and the fourth shaft portion 39. More specifically, the third shaft portion 38 and the fourth shaft portion 39 contact the edge in the +Y direction and the edge in the −Y direction of the opening 50 formed in the base plate 5A from the −Z direction. Further, the outer frame 30 contacts the third shaft portion 38 and the fourth shaft portion 39 from the −Z direction. Therefore, the outer frame 30 is placed in a position apart from the edge of the opening 50 in the −Z direction.

Figure 9:
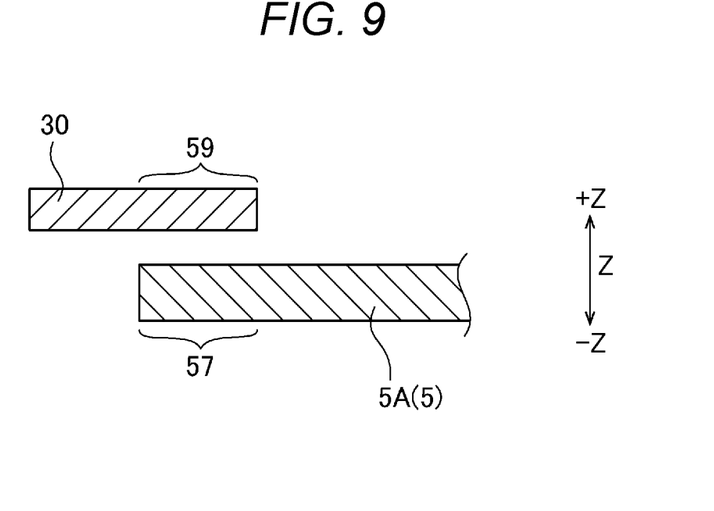
FIG. 9 is an explanatory diagram schematically showing sectional configurations of an abutting portion and an outer frame.

FIG. 9 is an explanatory diagram schematically showing sectional configurations of the abutting portion 57 and the outer frame 30 and schematically showing a sectional configuration of a position B-B in FIG. 5. As described above, the edge of the opening 50 has the abutting portions 57 in the four locations. On the other hand, the outer frame 30 includes facing portions 59 facing the abutting portions 57. As shown in FIG. 7, the facing portions 59 are provided in four corner portions in the outer frame 30. The abutting portions 57 face the facing portions 59 in the Z-axis directions via predetermined gaps.

Regarding the optical path change device 2, an amount of movement of the facing portion 59 in the +Z direction when a normal pixel shift operation is performed is smaller than a height of the gap between the abutting portion 57 and the facing portion 59 in the Z-axis directions. Therefore, the abutting portions 57 do not collide with the outer frame 30 in the normal pixel shift operation, however, when an impact is applied due to dropping or the like, collide with the outer frame 30 and restrict the movement of the outer frame 30.

First Actuator

The first actuator 6 includes the first magnetic drive mechanism 6A placed in the +Y direction of the inner frame 20 and the second magnetic drive mechanism 6B placed in the −Y direction of the inner frame 20. The first magnetic drive mechanism 6A and the second magnetic drive mechanism 6B respectively have magnets 61 and coils 62 facing with predetermined gaps in the Y-axis directions. The magnets 61 are supported by the inner frame 20 and the coils 62 are supported by the fixing base 5. When the coils 62 are energized, the magnets 61 move in the Z-axis directions relative to the coils 62. Thereby, a driving force around the first swing axis J1 is applied to the inner frame 20 with the magnets 61 fixed thereto. The coil 62 of the first magnetic drive mechanism 6A and the coil 62 of the second magnetic drive mechanism 6B are energized in synchronization with each other and apply driving forces in the same rotation direction to the inner frame 20.

The magnet 61 of the first magnetic drive mechanism 6A is fixed to an end of the first projecting portion 28 of the inner frame 20 via a rectangular magnet holding plate 63. Similarly, the magnet 61 of the second magnetic drive mechanism 6B is fixed to an end of the second projecting portion 29 of the inner frame 20 via the rectangular magnet holding plate 63. The coil 62 of the first magnetic drive mechanism 6A is fixed to an end of the first projecting portion 54 of the fixing base 5 via a coil holding plate 64. Further, the coil 62 of the second magnetic drive mechanism 6B is fixed to the edge of the opening 50 in the −Y direction in the fixing base 5 via the coil holding plate 64. The fixing base 5 has convex portions 58 projecting in the −Z direction from the end of the first projecting portion 54 and the edge of the opening 50 in the −Y direction. The coil holding plate 64 includes a first plate portion 641 to which the coil 62 is fixed and a second plate portion 642 bending from the first plate portion 641 in the −Z direction and fixed to an end surface of the convex portion 58.

In the first actuator 6, the magnet holding plate 63 and the coil holding plate 64 are made of metals such as iron and function as back yokes. Thereby, flux leakage may be reduced and magnetic efficiency may be increased. Note that stainless steel may be provided with a magnetic property by bending and may be used as a back yoke. Therefore, the coil holding plate 64 may be formed using stainless steel.

Second Actuator

The second actuator 7 includes the third magnetic drive mechanism 7A placed in the +X direction of the first projecting portion 36 of the outer frame 30 and the fourth magnetic drive mechanism 7B placed in the −X direction of the second projecting portion 37 of the outer frame 30. The third magnetic drive mechanism 7A and the fourth magnetic drive mechanism 7B respectively have magnets 71 and coils 72 facing with predetermined gaps in the X-axis directions. The magnets 71 are supported by the outer frame 30 and the coils 72 are supported by the fixing base 5. When the coils 72 are energized, the magnets 71 move in the Z-axis directions relative to the coils 72. Thereby, a driving force around the second swing axis J2 is applied to the outer frame 30 with the magnets 71 fixed thereto. The coil 72 of the third magnetic drive mechanism 7A and the coil 72 of the fourth magnetic drive mechanism 7B are energized in synchronization with each other and apply driving forces in the same rotation direction to the outer frame 30.

The magnet 71 of the third magnetic drive mechanism 7A is fixed to the first projecting portion 36 of the outer frame 30 via a rectangular magnet holding plate 73. The first projecting portion 36 and the third magnetic drive mechanism 7A are placed in the first region 50A of the opening 50 of the fixing base 5. The coil 72 of the third magnetic drive mechanism 7A is fixed to an edge of the first region 50A of the opening 50 in the +X direction via a coil holding plate 74. Similarly, the magnet 71 of the fourth magnetic drive mechanism 7B is fixed to the second projecting portion 37 of the outer frame 30 via the rectangular magnet holding plate 73. The second projecting portion 37 and the fourth magnetic drive mechanism 7B are placed in the second region 50B of the opening 50 of the fixing base 5. The coil 72 of the fourth magnetic drive mechanism 7B is fixed to an edge of the second region 50B of the opening 50 in the −X direction via the coil holding plate 74.

The coil holding plate 74 includes a first plate portion 741, a second plate portion 742 bending to form an acute angle relative to the first plate portion 741, and a third plate portion 743 bending to form an obtuse angle relative to the second plate portion 742. The coil 72 is fixed to the first plate portion 741. Regarding the coil holding plate 74 of the third magnetic drive mechanism 7A, the third plate portion 743 is fixed to an edge of the first region 50A in the +X direction. Further, regarding the coil holding plate 74 of the fourth magnetic drive mechanism 7B, the third plate portion 743 is fixed to an edge of the second region 50B in the −X direction.

In the second actuator 7, the magnet holding plate 73 and the coil holding plate 74 are made of metals such as iron and function as back yokes. Thereby, the flux leakage may be reduced and the magnetic efficiency may be increased. Note that stainless steel may be provided with a magnetic property by bending and may be used as a back yoke. Therefore, the coil holding plate 74 may be formed using stainless steel.

Drive Control of Optical Path Change Device

The optical path change device 2 swings the glass plate 10 and the inner frame 20 in the first swing direction about the first swing axis J1 and swings the outer frame 30 holding the glass plate 10 and the inner frame 20 in the second swing direction about the second swing axis J2 by drive signals supplied from a drive signal processing circuit (not shown) to the first actuator 6 and the second actuator 7. In the respective actuators, currents flow in the coils 62 and the coils 72 based on the drive signals. As a result, the glass plate 10 performs an optical path shift operation with a combination of swing in the first swing direction and swing in the second swing direction at a frequency according to the drive signals. Thereby, in the projector 1, the optical path of the picture light LL changes and images are displayed in the image display positions P1, P2, P3, P4 (see FIG. 2) at the frequency according to the drive signals.

Main Effects of Embodiment

As described above, the projector 1 of the embodiment includes the light source 102, the light modulation device 4 that modulates the light output from the light source 102, the projection optical device 3 that projects the light modulated by the light modulation device 4, the optical path change device placed between the light modulation device 4 and the projection optical device 3 and changing the optical path of the light modulated by the light modulation device 4, and the fixing base 5 as the holding member that holds the light modulation device 4 and the projection optical device 3. In the fixing base 5, the opening 50 through which the light modulated by the light modulation device 4 passes is provided. The optical path change device 2 has the glass plate 10 as the plate-like optical member that the light modulated by the light modulation device 4 enters, the inner frame 20 as the optical member holding part that holds the glass plate 10, and the outer frame 30 as the supporting member that swingably supports the inner frame 20, and the outer frame 30 is supported by the fixing base 5.

As described above, in the embodiment, the outer frame 30 of the optical path change device 2 is directly fixed to the fixing base 5 that holds the light modulation device 4 and the projection optical device 3. The optical path change device 2 in related art includes a supporting member that supports the outer frame 30 as another part than the fixing base 5, and thus, placement in a narrower space is difficult because the number of parts is larger. In the embodiment, the fixing base 5 is also used as the supporting member that directly supports the outer frame 30, and thus, the configuration in which the optical path change device 2 is placed between the light modulation device 4 and the projection optical device 3 may be realized in a smaller placement space than that in related art. Therefore, the configuration is advantageous for downsizing of the projector 1. Further, the number of parts is smaller and the number of assembly steps is smaller than those in related art.

In the projector 1 of the embodiment, as described above, both the light modulation device 4 and the projection optical device 3 are held by the fixing base 5 as the holding member, however, the present disclosure can be applied to a form in which one of the light modulation device 4 and the projection optical device 3 is held by the fixing base 5 as the holding member. That is, the projector 1 of the embodiment may have a form including the light source 102, the light modulation device 4 that modulates the light output from the light source 102, the projection optical device 3 that projects the light modulated by the light modulation device 4, the optical path change device 2 placed between the light modulation device 4 and the projection optical device 3 and changing the optical path of the light modulated by the light modulation device 4, and the fixing base 5 as the holding member that holds the light modulation device 4 or the projection optical device 3, in the fixing base 5, the opening 50 through which the light modulated by the light modulation device 4 passes is provided, the optical path change device 2 has the glass plate 10 as the plate-like optical member that the light modulated by the light modulation device 4 enters, the inner frame 20 as the optical member holding part that holds the glass plate 10, and the outer frame 30 as the supporting member that swingably supports the inner frame 20, and the outer frame 30 is supported by the fixing base 5.

Further, in the embodiment, more room may be secured in the placement space for the optical path change device 2 than that in related art, and thus, the light modulation device 4 and the optical path change device 2 may be separated. Therefore, inconvenience due to parts closer to each other may be avoided or suppressed. For example, collision and breakage of the parts by an impact due to dropping or the like may be less likely. Or, when one of the optical path change device 2 and the light modulation device 4 contains a part that generates a magnetic field, an influence on the other by the magnetic field may be reduced.

In the embodiment, a part of the glass plate 10 is placed at the inner peripheral side of the opening 50. Thereby, a part of the glass plate 10 in the plate thickness direction is placed within the range of the plate thickness of the base plate 5A and a part of the optical path change device 2 in the Z-axis directions (optical axis directions) is placed within the range of the placement region of the fixing base 5 in the Z-axis directions. Accordingly, for placement of the optical path change device 2, the dimension of the necessary placement space in the optical axis directions between the fixing base 5 and the light modulation device 4 may be reduced. Therefore, the placement space for the optical path change device 2 may be easily secured and, even when the gap between the projection optical device 3 and the light modulation device 4 is narrower, the configuration in which the optical path change device 2 is placed between the light modulation device 4 and the projection optical device 3 may be realized.

Note that the whole glass plate 10 may be placed at the inner peripheral side of the opening 50. That is, a configuration in which the whole glass plate 10 is placed within the range of the plate thickness of the base plate 5A may be employed.

Thereby, the dimension of the necessary space in the optical axis directions between the fixing base 5 and the light modulation device 4 may be further reduced.

In the embodiment, the inner frame 20 of the optical path change device 2 is swingably supported about the first swing axis J1 crossing the optical axis L of the light entering the glass plate 10. The outer frame 30 is the frame-like member surrounding the inner frame 20 and swingably supported about the second swing axis J2 crossing the optical axis L and crossing the first swing axis J1 by the fixing base 5. As described above, the inner frame 20 and the outer frame 30 are swung about the swing axes crossing each other, and thereby, pixel shifts in the two directions crossing each other may be performed. Further, although the optical path change device 2 may perform the pixel shifts in the two directions, the number of parts may be reduced and the placement space necessary for placement between the light modulation device 4 and the projection optical device 3 may be reduced.

The optical path change device 2 of the embodiment includes the third magnetic drive mechanism 7A and the fourth magnetic drive mechanism 7B that swing the outer frame 30, and the third magnetic drive mechanism 7A and the fourth magnetic drive mechanism 7B respectively include the magnets 71 and the coils 72. The coils 72 are supported by the fixing base 5 and the magnets 71 are supported by the outer frame 30. As described above, the magnetic drive mechanisms are formed between the fixing base 5 and the outer frame 30, and thereby, the placement space for the second actuator that swings the outer frame 30 may be reduced. Therefore, the placement space for the optical path change device 2 may be reduced.

In the third magnetic drive mechanism 7A and the fourth magnetic drive mechanism 7B of the embodiment, the coil holding plates 74 fixed to the fixing base 5 and the magnet holding plates 73 fixed to the outer frame 30 are provided, and the coils 72 are fixed to the fixing base 5 via the coil holding plates 74. Further, the magnets 71 are fixed to the outer frame 30 via the magnet holding plates 73. The coil holding plates 74 and the magnet holding plates 73 function as back yokes, and thereby, the flux leakage may be reduced and the magnetic efficiency may be increased.

In the third magnetic drive mechanism 7A and the fourth magnetic drive mechanism 7B, the placements of the magnets 71 and the coils 72 may be exchanged. That is, a configuration in which the coils 72 are supported by the outer frame 30 and the magnets 71 are supported by the fixing base 5 may be employed. Note that, when the coils 72 are placed on the fixing base 5, wiring coupling to the coils 72 may be made easier because the coils 72 are immovable.

In the embodiment, the fixing base 5 includes the abutting portions 57 overlapping with the outer frame 30 as seen from the Z-axis directions (optical axis directions). The abutting portions 57 are placed in positions outside of the movement range of the outer frame 30 swinging around the second swing axis J2 in the Z-axis directions (optical axis directions). That is, the gaps in the Z-axis directions (optical axis directions) between the abutting portions 57 and the facing portions 59 facing the abutting portions 57 from the −Z direction are larger than the amounts of movement of the abutting portions 57 in the −Z direction in the normal pixel shift operation. As described above, the abutting portions 57 are placed in the positions without collision with the outer frame 30 in the normal pixel shift operation of swinging the outer frame 30 by the third magnetic drive mechanism 7A and the fourth magnetic drive mechanism 7B, and thereby, when an impact due to dropping or the like is applied, the movement range of the outer frame 30 may be restricted without any influence on the pixel shift operation. Therefore, deformation and breakage of the outer frame 30 due to an impact may be suppressed.

In the embodiment, the edge of the opening 50 provided in the fixing base 5 overlaps with the corner portions of the outer frame 30 as seen from the Z-axis directions (optical axis directions), and the facing portions 59 facing the abutting portions 57 are provided in the corner portions of the outer frame 30. As described above, the facing portions 59 colliding with the abutting portions 57 are provided in the corner portions apart from the second swing axis J2, and thereby, application of a load on the third shaft portion 38 and the fourth shaft portion 39 at the time of impact may be suppressed. Therefore, deformation and breakage of the third shaft portion 38 and the fourth shaft portion 39 may be suppressed. Further, the abutting portions 57 are provided in the plurality of locations (four locations in the embodiment), and thereby, resistance to impact may be increased. Note that the number of the abutting portions 57 is not limited to four, but may be another number.

Modified Example 1

Figure 10:
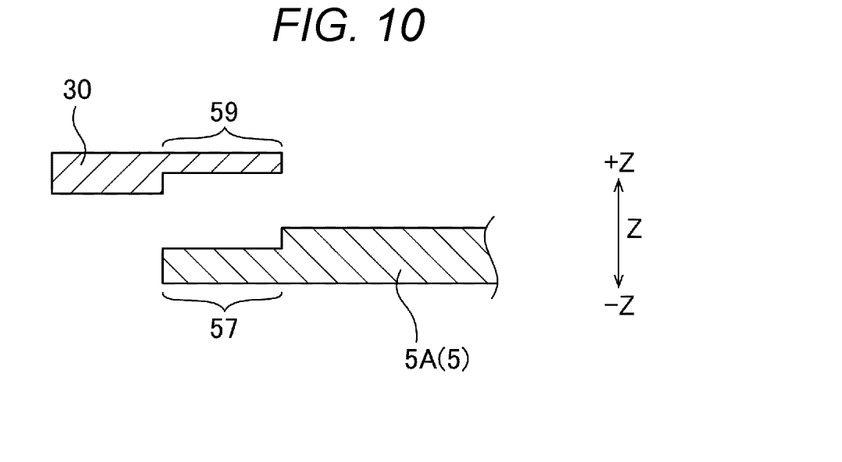
FIG. 10 is an explanatory diagram schematically showing sectional configurations of an abutting portion and an outer frame of Modified Example 1.

FIG. 10 is an explanatory diagram schematically showing sectional configurations of an abutting portion 57 and an outer frame 30 of Modified Example 1. The abutting portion 57 of Modified Example 1 is recessed toward the opposite side to the facing portion 59 facing the abutting portion 57. Further, in the outer frame 30 of Modified Example 1, the facing portion 59 is recessed toward the opposite side to the abutting portion 57. Therefore, the plate thicknesses of the abutting portion 57 and the facing portion 59 in the Z-axis directions (optical axis directions) are thinner than those of the above described embodiment, and the height of the placement region of the abutting portion 57 and the facing portion 59 in the Z-axis directions (optical axis directions) may be made smaller. Thereby, a part of the outer frame 30 in the Z-axis directions (optical axis directions) is placed within the range of the placement region of the fixing base 5 in the Z-axis directions. Therefore, the dimension of the necessary placement space in the optical axis directions between the fixing base 5 and the light modulation device 4 for placement of the optical path change device 2 may be reduced.

Note that one of the abutting portion 57 and the facing portion 59 may have a shape recessed toward the opposite side to the other and the other may have a non-recessed shape.

Modified Example 2

Figure 11:
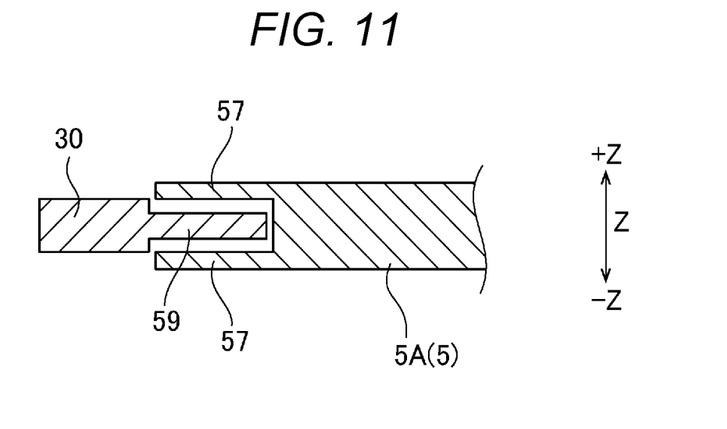
FIG. 11 is an explanatory diagram schematically showing sectional configurations of an abutting portion and an outer frame of Modified Example 2.

FIG. 11 is an explanatory diagram schematically showing sectional configurations of abutting portions 57 and an outer frame 30 of Modified Example 2. In Modified Example 2, the abutting portions 57 are placed on both sides of the facing portion 59 in the Z-axis directions (optical axis directions). Thereby, the movement of the outer frame 30 may be restricted on both sides in the Z-axis directions (optical axis directions), and resistance to impacts in a plurality of directions may be increased. Note that, also, in Modified Example 2, the abutting portions 57 are recessed toward the opposite side to the facing portion 59 and the facing portion 59 is recessed toward the opposite side to the abutting portions 57, however, the abutting portions 57 and the facing portion 59 do not necessarily have recessed shapes, but may have the same plate thicknesses as the other portions. Or, one of the abutting portion 57 and the facing portion 59 may have a recessed shape and the other may have a non-recessed shape.

Modified Example 3

In the above described embodiment and modified examples 1, 2, the abutting portion 57 is integrally formed with the edge of the opening 50 in the fixing base 5, however, the abutting portion 57 may be provided by attachment of another member to the edge of the opening 50. Further, similarly to the facing portion 59, the facing portion 59 may be provided by attachment of another member to the edge of the outer frame 30. Note that, when another member is attached, another reinforcing member than the members used as the abutting portion 57 and the facing portion 59 may be added. Thereby, breakage at the time of impact may be suppressed.

What is claimed is:

1. A projector comprising:
a light source;
a light modulation device that modulates a light output from the light source;
a projection optical device that projects the light modulated by the light modulation device;
an optical path change device placed between the light modulation device and the projection optical device and changing an optical path of the light modulated by the light modulation device; and
a holding member that holds the light modulation device or the projection optical device, wherein
an opening through which the light modulated by the light modulation device passes is provided in the holding member,
the optical path change device has an optical member that the light modulated by the light modulation device enters, an optical member holding part that holds the optical member, and a supporting member that swingably supports the optical member holding part, and
the supporting member is supported by the holding member.

2. The projector according to claim 1, wherein
at least a part of the optical member is placed at an inner periphery side of the opening.

3. The projector according to claim 1, wherein
the optical member holding part is swingably supported about a first swing axis crossing an optical axis of the light entering the optical member, and
the supporting member is a frame-like member surrounding the optical member holding part and swingably supported about a second swing axis crossing the optical axis and crossing the first swing axis by the holding member.

4. The projector according to claim 3, wherein
the optical member holding part has a shaft portion forming the first swing axis, and
the optical member holding part and the supporting member are coupled by the shaft portion of the optical member holding part.

5. The projector according to claim 4, wherein
the shaft portion of the optical member holding part has a first shaft portion and a second shaft portion sandwiching the optical member and forming the first swing axis, and the optical member holding part and the supporting member are coupled by the first shaft portion and the second shaft portion of the optical member holding part.

6. The projector according to claim 3, further comprising a first actuator that swings the optical member about the first swing axis, wherein
the first actuator is coupled to the optical member holding part at one side and fixed to the holding member at another side.

7. The projector according to claim 3, wherein
the supporting member has a shaft portion forming the second swing axis, and
the supporting member and the holding member are coupled by the axis portion of the supporting member.

8. The projector according to claim 7, wherein
the shaft portion of the supporting member has a third shaft portion and a fourth shaft portion sandwiching the optical member holding part and forming the second swing axis, and
the supporting member and the holding member are coupled by the third shaft portion and the fourth shaft portion of the supporting member.

9. The projector according to claim 3, further comprising a second actuator that swings the optical member about the second swing axis, wherein
the second actuator is coupled to the supporting member at one side and fixed to the holding member at another side.

10. The projector according to claim 9, wherein
the second actuator includes a magnetic drive mechanism,
the magnetic drive mechanism has a magnet and a coil,
one of the magnet and the coil is supported by the holding member, and
another of the magnet and the coil is supported by the supporting member.

11. The projector according to claim 10, wherein
a yoke fixed to the holding member is provided, and
one of the magnet and the coil is fixed to the holding member via the yoke.

12. The projector according to claim 3, wherein
the holding member includes an abutting portion overlapping with the supporting member as seen from the optical axis direction.

13. The projector according to claim 12, wherein
the supporting member includes a facing portion that faces the abutting portion, and
an amount of movement of the facing portion by driving of the optical path change device is smaller than a gap between the abutting portion and the facing portion.

14. The projector according to claim 13, wherein
the abutting portions are placed on both sides of the supporting member in the optical axis direction.

15. The projector according to claim 1, wherein
both the light modulation device and the projection optical device are held by the holding member.

* * * * *